United States Patent [19]

Cryer et al.

[11] Patent Number: 5,394,851
[45] Date of Patent: Mar. 7, 1995

[54] ELECTRONIC FUEL INJECTION SYSTEM FOR LARGE COMPRESSION IGNITION ENGINE

[75] Inventors: Robert D. Cryer, Erie, Pa.; Benjamin E. Bulkley, Schenectady, N.Y.; Dale E. LaPlante, Goleta, Calif.; James M. A. Askew, Gloucester, United Kingdom; Alan G. Jones, Gloucester, United Kingdom; Andrew J. Lilley, Gloucester, United Kingdom; Goulielmos Vranas, Gloucester, United Kingdom; Richard T. Gunner, Gloucester, United Kingdom; Robert M. Hopper, Gloucester, United Kingdom; Robert J. Glibbery, Hants, United Kingdom; Charles E. Cooper, Erie, Pa.

[73] Assignee: General Electric Company, Erie, Pa.
[21] Appl. No.: 947,666
[22] Filed: Sep. 18, 1992
[51] Int. Cl.$^6$ ............................................. F02D 41/40
[52] U.S. Cl. ................................... 123/476; 123/506
[58] Field of Search ............... 123/414, 476, 478, 506, 123/613, 500, 501, 502, 503

[56] References Cited

U.S. PATENT DOCUMENTS

| | | | |
|---|---|---|---|
| 3,742,918 | 7/1973 | Murtin et al. | 123/458 |
| 3,762,379 | 10/1973 | Hobo et al. | 123/447 |
| 4,211,202 | 7/1980 | Hafner et al. | 123/457 |
| 4,297,982 | 11/1981 | Lakra | 123/502 |
| 4,932,388 | 6/1990 | Chiba et al. | 123/613 |
| 5,113,830 | 5/1992 | Haines | 123/506 X |

FOREIGN PATENT DOCUMENTS

| | | |
|---|---|---|
| 2587757 | 3/1987 | France . |
| 2041577A | 1/1979 | United Kingdom . |

OTHER PUBLICATIONS

"Single Bank Drive Device of V Type Engine," Hachiman Yoichiro, Patent abstract of Japan, publication number JP4232346, publication date Aug. 20, 1992, abstract publication date Dec. 25, 1992, abstract volume 016585, application date Dec. 28, 1990, application number JP900416302.

"Controller for Fuel Injection Pump," Yamaguchi Susumu et al., Patent abstract of Japan, publication number JP4101046, publication date Apr. 2, 1992, abstract publication date Jul. 22, 1992, abstract volume 016339, application date Aug. 14, 1990, application number JP900215250.

"Controller for Diesel Engine Locomotive," Moriya Koichi, Patent abstract of Japan, publication number JP61089935, publication date May 8, 1986, abstract publication date Sep. 11, 1986 abstract volume 010267, application date Oct. 11, 1984, application number JP840211419.

"An Electronically Controlled High Pressure Fuel Injection System for Improved Performance of Medium Speed Diesel Engines." CMD Little and PF Scott. CIMAC Helsinki, Jan. 1981.

Primary Examiner—Willis R. Wolfe
Attorney, Agent, or Firm—Jill M. Breedlove; Marvin Snyder

[57] ABSTRACT

An electronic fuel injection system for providing variable injection timing for a compression ignition engine having a per cylinder displacement volume of at least 5.5 liters includes individual fuel delivery mechanisms, such as a fuel pump having a constant displacement fuel pumping chamber, and fuel injector for each corresponding cylinder, and has a timing signal generator, such as a multi-track optical encoder coupled to a camshaft, for generating a timing signal and a cylinder index signal. The invention also includes an electronic controller device, such as a plurality of individual controllers, which are responsive to various sensor inputs which include the timing signal and the cylinder index signal, for electronically controlling the individual fuel delivery mechanisms. The fuel delivery mechanisms are responsive to an output signal from the electronic controller device and provide a fuel flow volume range of between 100–1600 mm$^3$/stroke over a fuel injection pressure range of between approximately 10–20 k.p.s.i. to a corresponding fuel injector. Each fuel delivery mechanism has an electronically controlled solenoid valve responsive to an output signal, in conjunction with a shuttle valve in fluid communication with the solenoid, which provide a high spill fuel volume from the constant displacement fuel pumping chamber.

12 Claims, 4 Drawing Sheets

ELECTRONIC FUEL INJECTION SYSTEM FOR LARGE COMPRESSION IGNITION ENGINE

BACKGROUND OF THE INVENTION

The invention relates generally to electronic fuel control systems for compression ignition engines, and more particularly to fuel injection control systems for compression ignition engines having cylinders with large displacement volumes such as locomotive or marine type engines.

Currently, no variable injection timing systems for diesel engines are known to be commercially available for locomotive applications. Known locomotive engines typically have fixed injection timing through a governor and mechanical linkages which actuate a series of fuel delivery devices simultaneously. Fuel amounts and/or timing of fuel injection are generally predetermined for any given engine operating point and typically cannot be modified for varying conditions. Fuel delivery systems may include pump-line-nozzle configurations or unit injection configurations.

Strict emission requirements will soon be imposed on the locomotive engine industry to reduce exhaust fuel emissions to suitable levels. Although electronic fuel control systems for reducing fuel emissions have been developed for diesel truck engines, these types of systems are generally not suited to the unique designs of much larger diesel engines.

For example, the single cylinder displacement for a large sixteen cylinder locomotive diesel engine may be on the order of 11 liters whereas the single cylinder displacement for a typical diesel truck may be on the order of only 2 liters per cylinder. Therefore a single cylinder for a large locomotive engine may easily be more than five times larger than that of a large diesel truck. This generally translates into very different design constraints since high injection pressure levels (on the order of 10–20 k.p.s.i.) are required in conjunction with much higher volume fuel flow rate ranges (100–1600 $mm^3$/stroke) to effectuate proper combustion in the larger locomotive engine.

A problem arises with such large engines since both low fuel volume demand conditions, such as during idle (on the order of 100 $mm^3$/stroke), and high volume demand conditions (on the order of 1600 $mm^3$/stroke) must be accommodated during normal operating conditions. Therefore the fuel delivery system must be capable of providing a wide range of fuel flow volumes at high injection pressures. Accommodating such requirements becomes increasingly difficult where the fuel delivery mechanisms use a constant displacement type system as known in the art. These systems typically fill a pumping chamber with the same amount of fuel irrespective of the actual fuel necessary for the injector. During low fuel volume demand conditions, excess fuel from the pumping chamber must be spilled or recirculated to a supply reservoir. Consequently both high spill volumes (e.g., 1500 $mm^3$/stroke when the fuel volume demand is only 100 $mm^3$/stroke) and high pressures must be accommodated by the fuel delivery mechanism. Currently no electronically controllable fuel delivery mechanisms are known to be commercially available which may accommodate such high spill volumes and provide such high injection pressures.

Other differences also impact the type of fuel injection system which may be employed on larger compression ignition engines. For example, locomotive engines are typically designed to maintain governor stability e.g., provide a relatively constant speed output to provide a steady power generating source for large DC motors used to propel the wheels. Powering large DC motors also causes additional electromagnetic interference not typically found in truck applications.

Also, large locomotive engines encounter radical load changes due to switching of large auxiliary loads such as compressor loads, fan loads, and "hotel" power loads (an alternator for generating 110 V at 60 hz) for passenger train applications. Driving such loads or turning off such loads can result in load changes on the order of 500 horsepower at any instant.

Larger engines also typically generate much larger vibrations. It has been a problem to provide accurate engine speed information using such devices as magnetic pick-up sensors since vibrations cause false triggering and typical notches in flywheels only provide coarse and noisy signals typically insufficient for accurate electronically controlled injection timing systems. Hence regular timing components and other electrical devices cannot typically withstand such severe operating conditions.

Another design consideration generally unique to such larger engines, is lower engine speeds (RPM) and reduced chamber air movement. Smaller engines typically operate at engine speeds of several thousand RPM's. However, larger locomotive engines typically operate at between 0–1050 RPM. The rate at which the pistons move generally impacts the air intake speed and/or swirl. Lower RPM typically translates into slower air intake. With smaller volume cylinders, sufficient chamber air movement to allow proper atomization of the fuel to air mixture typically occurs during the down stroke. However, larger cylinders typically have much less cylinder air movement which results in a more stagnant trapped air volume. This generally requires a greater fuel injection pressure to be applied to overcome the in-cylinder compression and penetrate the trapped air volume in a sufficiently atomized state, such that entrainment will result in a homogenous and stoichiometric burn of the air/fuel mixture.

Consequently there exists a need for a variable timing fuel injection system for larger compression ignition engines to reduce exhaust emissions, improve fuel consumption and eliminate unnecessary mechanical components and linkages. Such a system should provide high fuel flow rates and high fuel injection pressure to the injectors to allow the engine to operate efficiently.

SUMMARY OF THE INVENTION

It is an object of the present invention to provide an electronically controlled fuel injection system for large compression ignition engines which facilitates variable injection timing through accurate programmable control to reduce exhaust emissions while minimizing the penalty upon fuel consumption.

It is another object of the invention to provide an electronic fuel control system which utilizes a constant displacement type fuel delivery mechanism which can facilitate high injection pressures over a wide range of fuel delivery volumes to provide proper combustion.

A further object of the invention is to provide an electronic fuel control system that is capable of sequentially controlling the injection of fuel on a per cylinder basis.

It is also an object of the invention to provide an electronic fuel control device, which is responsive to one of a plurality of desired speed signals, for variably controlling the injection timing to optimize fuel consumption, based upon the desired speed signal.

The present invention includes individual fuel delivery mechanisms, such as a fuel pump and fuel injector, for each corresponding cylinder and has a timing signal generator, such as a multi-track optical shaft encoding means operatively coupled to a camshaft, for generating a timing signal corresponding to engine speed, and a cylinder index signal for indicating at least which cylinder is the reference cylinder. The invention also includes an electronic controller device, such as a plurality of individual controllers, which are responsive to the timing signal and the cylinder index signal, for electronically controlling the individual fuel delivery mechanisms. The fuel delivery mechanisms are responsive to an output signal from the electronic controller device and provide a fuel flow volume range of between approximately 100–1600 $mm^3$/stroke (per injection event) over a fuel injection pressure range of between approximately 10–20 k.p.s.i. to a corresponding fuel injector.

The fuel delivery mechanism has an electronically controlled solenoid valve responsive to the output signal for controlling the diversion or spill of fuel flow from a constant displacement fuel chamber, such as a pumping chamber, and also has a valve, such as a shuttle valve, responsive to the control solenoid valve and in fluid communication with the solenoid, for providing additional spill from the constant displacement fuel chamber during lower fuel flow demand conditions.

The inventive electronic fuel control system for large compression ignition engines may also have a dedicated load controller coupled to the electronic controller, for outputting a signal corresponding to one of a plurality of selected engine speed levels. The load controller activates and/or deactivates a controllable load in response to an overload indication signal as generated by the electronic controller.

Also disclosed is a unitized power assembly, for a compression ignition engine having a per cylinder displacement volume of at least 5.5 liters, which has a cylinder and a corresponding fuel delivery mechanism wherein the fuel delivery mechanism includes an electronically controlled valve, such as a solenoid, which is responsive to a control signal, such as from the electronic controller. The fuel delivery mechanism also includes a valve, such as a shuttle valve, in fluid communication with the electronically controlled valve means, for diverting fuel from a constant displacement fuel chamber. The fuel delivery mechanism provides a fuel injection pressure range of between approximately 10–20 k.p.s.i. and the electronically controlled valve in combination with the valve facilitate a fuel flow volume range of between approximately 100–1600 $mm^3$/stroke. The combination of the electronically controlled valve and the shuttle valve spill fuel to a supply reservoir from the constant displacement fuel chamber.

DESCRIPTION OF THE PREFERRED EMBODIMENTS

Figure 1:
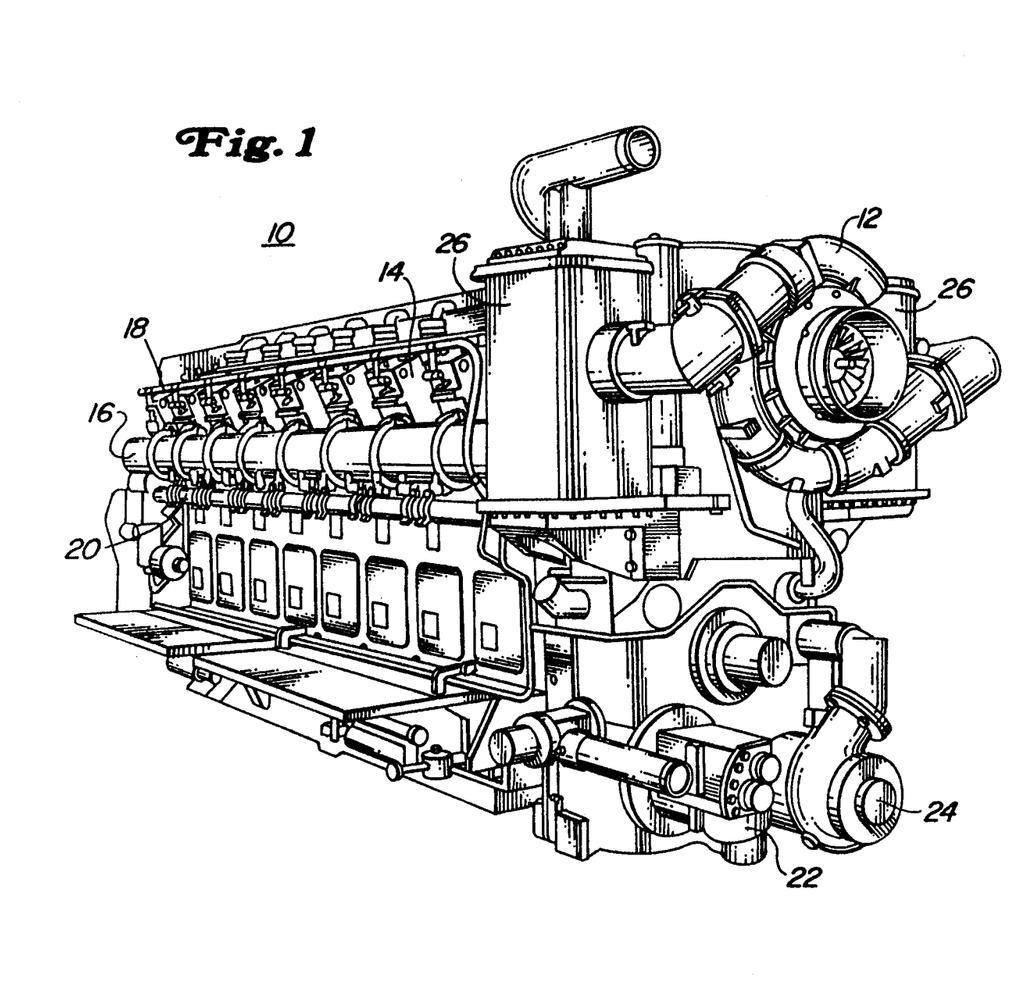
FIG. 1 is a perspective view of a Vee-style diesel locomotive engine having an electronic fuel injection system in accordance with the invention.

FIG. 1 generally depicts a compression ignition diesel engine 10 which employs an electronic fuel control system in accordance with the invention. The engine 10 may be any large diesel engine such as a model FDL-12 or FDL-16 diesel engine as manufactured by General Electric, Erie, Pa. Such an engine may include a turbo charger 12 and a series of unitized power assemblies 14. For example, a 12-cylinder engine has 12 such power assemblies while a 16 cylinder engine has 16 such power assemblies. The engine 10 further includes an air intake manifold 16, a fuel supply line 18 for supplying fuel to each of the power assemblies 14, a water inlet manifold 20 used in cooling the engine, a lube oil pump 22 and a water pump 24, all as known in the art. An intercooler 26 connected to the turbo charger 12 facilitates cooling of the turbo charged air before it enters a respective combustion chamber inside one of the power assemblies 14. The engine may be a Vee-style type, also as known in the art.

Figure 2:
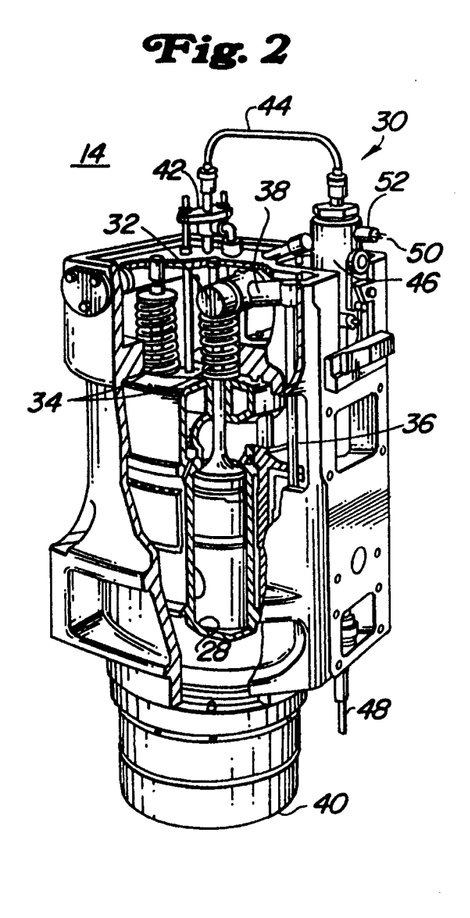
FIG. 2 is a partial cut away view of a unitized power assembly controlled by an electronic fuel injector control device in accordance with the invention.

FIG. 2 depicts one of the plurality of power assemblies 14 which includes a cylinder 28 and corresponding fuel delivery mechanism generally indicated at 30 for delivering fuel to the combustion chamber within the cylinder 28. Each unitized power assembly 14 may further include an air valve rocker arm shaft 32 for moving a plurality of spring-biased air valves generally indicated at 34. The valve rocker arm shaft 32 is connected to the valve pushrod 36 through the valve rocker arm 38. The air valve rocker arm shaft 32 is connected to a valve pushrod 36 and is actuated as known in the art.

Each unitized power assembly 14 further includes a cylinder liner 40 which is insertable into a bored aperture (not shown) in the engine block of the engine 10. The unitized power assembly 14 includes a cylinder jacket or casting for housing the cylinder 28 and associated components. For the aforedescribed engine 10, the preferred range of injection pressure is between approximately 15–20 k.p.s.i. The preferred fuel delivery flow volume range is between 100–1600 $mm^3$/stroke. The per cylinder displacement may be at least 5.5 liters and is preferably about 11 liters.

The fuel delivery mechanism 30 includes a fuel injecting mechanism 42 connected to a high-pressure injection line 44 which fluidly connects to a fuel pressure generating unit 46 such as a fuel pump. This configuration is known as a pump-line-nozzle configuration. The fuel pressure generating unit 46 builds pressure through the actuation of fuel pushrod 48 as will be described later. The fuel delivery mechanism 30 includes an electronic signal line 50 for receiving electronic signals from an electronic controller. The electronic signal line 50 provides a control signal to an electronically-controlled valve 52 which forms part of the fuel delivery mechanism 30. The unitized power assembly 14 derives its name from the fact that each cylinder and accompanying components (or power assembly) may be removed from the engine individually to facilitate servicing. Consequently, the entire engine need not be removed or replaced to facilitate repair of the cylinder or any of its associated components.

Figure 3:
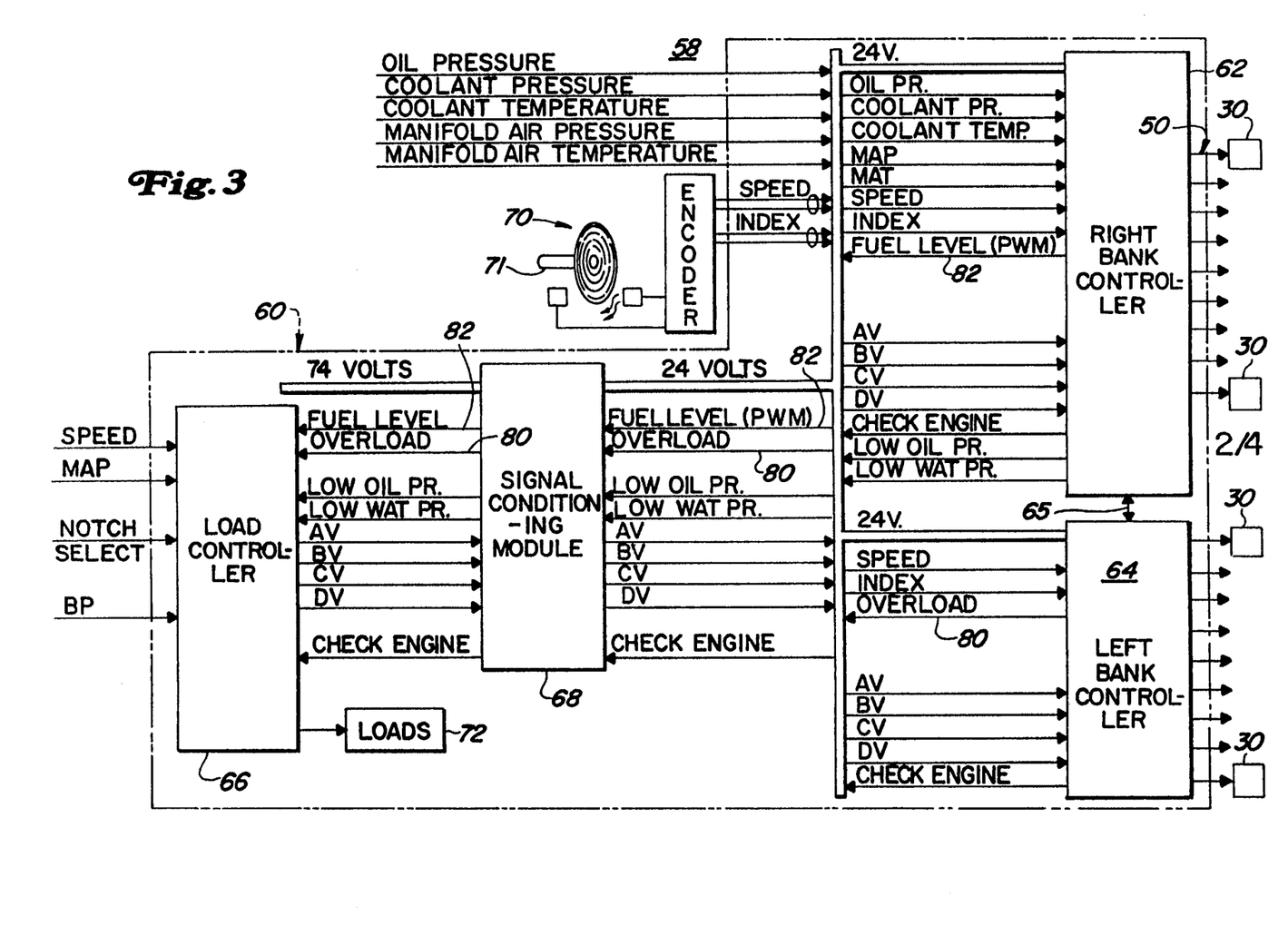
FIG. 3 is a schematic block diagram of an electronic fuel injection system in accordance with the invention.

FIG. 3 schematically depicts a fuel injection system 58 which has an electronic control device 60 for providing variable timing to each corresponding fuel delivery mechanism 30 of the engine 10. The electronic controller 60 in a preferred embodiment includes a right bank controller 62 such as a Lucas Controller Model 24CU, and left bank controller 64 which may also be a Lucas Controller Model 24CU as manufactured by Lucas ECG, Cirencester, England. The controllers 62 and 64 determine the amount of fuel and proper injection timing based on a plurality of sensor inputs and stored lookup tables. The electronic controller 60 also includes a load controller 66 and a signal-conditioning module 68 which serves as an interface between the bank controllers 62 and 64 and the load controller 66 so that the signal levels from one type of controller may be understood by the other controller. The fuel injection system 58 also includes a timing signal generator 70 such as an optical multi-track disk encoder coupled to one of the engines camshafts 71.

A serial communication link 65 such as a plurality of serial ports, serve as the communication medium between the bank controllers 62 and 64. The right bank controller controls the injection of fuel to a right bank of cylinders while the left bank controller 64 controls the fuel injection to a left bank of cylinders. Each controller periodically compares an input signal, communicated over link 65 from the other controller, to determine whether either of the controllers is malfunctioning.

The controllers 62 and 64 receive a number of inputs from various sensors located throughout the engine 10. Some of these sensors include, for example, coolant temperature, manifold air pressure, manifold air temperature, the engine speed indication signal from the optical multi-track encoder 70, and the index signal from the optical multi-track encoder 70. Given these inputs, the controllers determine which cylinder should be fired at which particular moment in time and also determine a suitable injection timing and fuel injection duration period during which the injector provides fuel to the cylinder. The controllers sequentially actuate the fuel delivery mechanism 30 corresponding to each cylinder. The variable timing feature and the sequential control of the fuel delivery mechanism 30 provides more efficient fuel consumption, reduced exhaust emissions over the previous mechanical systems which typically actuate the fuel delivery mechanisms of a bank of cylinders in a fixed manner.

To further improve engine operating efficiency, the controllers 62 and 64 may be programmed to periodically skip the normal firing sequence to determine the impact of a plurality of cylinders or a single cylinder to determine whether a given cylinder is providing nominal power. For example, the controllers 62 and 64 may deny fuel to a number of selected cylinders and measure the engine speed to determine whether or not these non-firing cylinders contributed a proper amount of power to the engine. Where it is determined that the cylinder is not performing up to expectations, the controller then supplies more or less fuel and/or timing advance to that particular cylinder based on the determination of its efficiency based on this skip-firing technique. The sequential skip-firing may be carried out any suitable time, such as immediately after start-up of the engine or periodically during normal operating of the engine, depending upon the terrain or load requirements of the engine at any given time. It will also be recognized that the controller may be programmed to provide cylinder disablement typically during idle for purposes of saving fuel. The right and left bank controllers also provide engine protection functions based on the input levels of the oil pressure sensor, water pressure sensor and the overload demand signal 80. The controllers 62 and 64 also generate a check engine signal to indicate that one of the controllers malfunctioned.

The load controller 66 may be of the type GE Model No. 17FL264 and serves to control various auxiliary loads 72 such as fan motors, wheel propulsion motors, compressor motors, and hotel power alternators and further determines the fuel-to-air ratio based on the current MAP, fuel level signal (PWM) and barometric pressure (BP) sensor inputs.

As previously mentioned, the diesel engine 10 as applied in a locomotive engine application serves generally as a fixed speed power generator. Engine power demands are requested directly by an engine operator via a notch select input such as when an engine operator moves a notch select lever to one of a plurality of notches (as defined by an engine RPM and horsepower level). This engine power demand request is translated by the load control to a speed demand signal represented by a digital signal via signal lines av, bv, cv, and dv from the load controller 66. The logic states of the av, bv, cv, and dv signal lines represent a predetermined desired engine RPM level. For example, a digital pattern of 0000 may indicate an engine demand of 336 RPM whereas a digital pattern of 1111 may indicate an engine demand of 888 RPM. The speed demand signal (av, by, cv and dv) serves as the speed control signal input to the right bank controller 62 and left bank controller 64.

For example, when an operator wishes to increase engine power, the four-digit input will reflect a different signal indicative of an increase in speed demand so that the left bank controller and right bank controller inject a greater amount of fuel into the cylinders to meet the requested power. The digital speed demand input signal is configured so that a plurality of fixed digitally represented singular speed levels may be input to the controllers.

Figure 4:
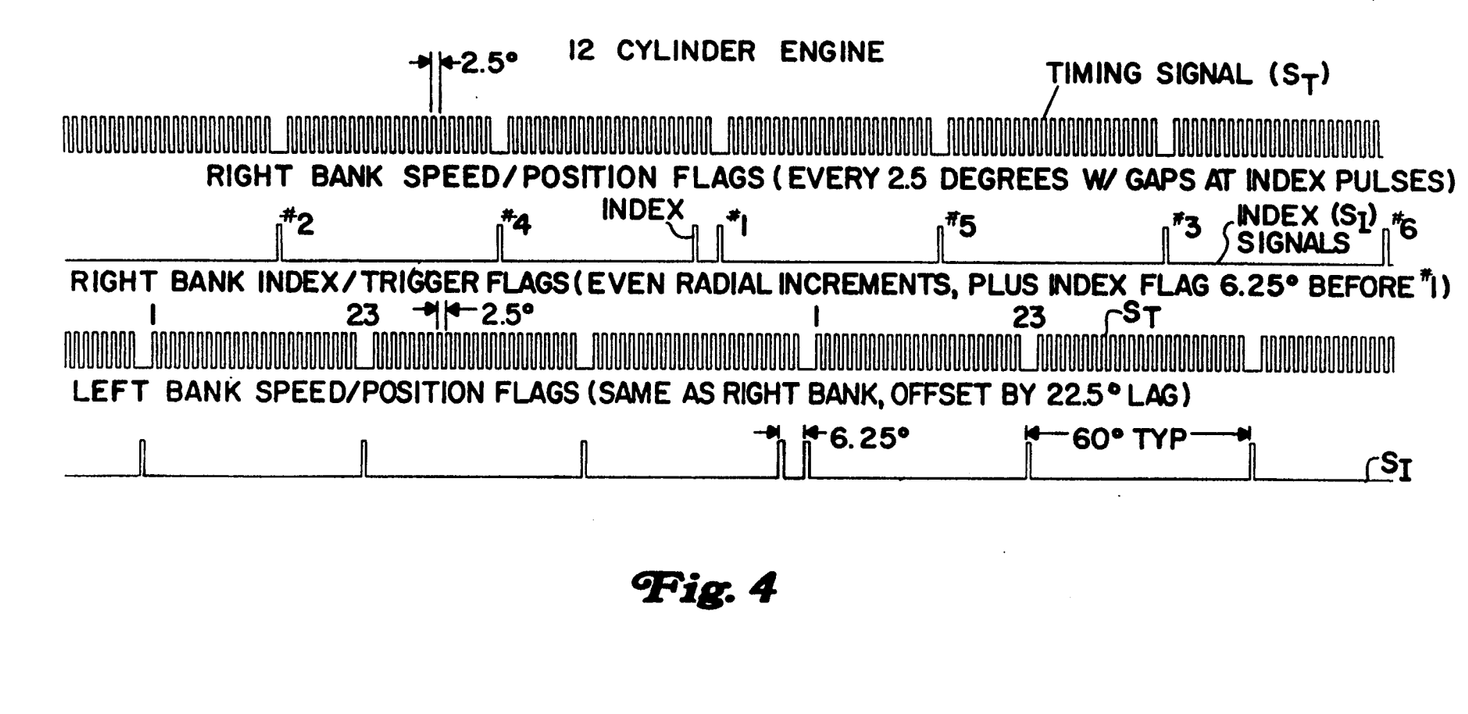
FIG. 4 is a timing signal diagram for use by the electronic fuel injection system depicted in FIG. 3 in accordance with the invention.

Referring to FIGS. 3 and 4, the timing signal generator 70 generates a timing signal $S_T$ corresponding to the engine speed and an index signal $S_I$ which provides a pulse of each cylinder period and also has an additional pulse which identifies the first cylinder (#1) of the sequence of corresponding cylinders of the engine. These signals have zero crossings which are detected by the controllers 62 and 64. The timing signal generator 70 rotates as a function of the rotation of the camshaft. The camshaft 71 rotates at one half the speed of the crankshaft. The timing signal generator may be an optical encoder manufactured by BEI Motion Systems Company, California, but any suitable encoding device may also be used. The optical based signal generator is less sensitive to electromagnetic interference which abounds in locomotive engines that drive D.C. motors and also provides a more stable and accurate signal than conventional magnetic reluctance sensors coupled to notched flywheels.

The timing signal $S_T$ (or speed signal) and index signal $S_I$ are input into both controllers 62 and 64 so that if one controller fails, the other controller may still generate a sufficient injector timing profile to keep the engine operational until the fault may be repaired. Consequently, the redundancy of a right bank controller and a left bank controller affords greater flexibility during failure conditions.

The signal conditioning module 68 serves as an interface module between the bank controllers 62 and 64 and to the load controller 66. For example, the module 68 may contain voltage scaling circuitry and filtering circuitry so that voltage levels between the load controller and the bank controllers are compatible. However, such a signal conditioning module may not be necessary where the input and output levels of the bank controllers 62 and 64 are compatible with those of the load controller 66.

Variable injection timing is accomplished through software control by the right and left bank controllers 62 and 64, respectively. Each controller includes a memory device which stores a series of look-up tables used to determine optimum timing profiles based on a variety of inputs, such as calculated injection fuel volume, MAP input, MAT input, speed input and coolant temperature. When a selected speed is input into the controllers via the signal lines av, bv, cv and dv, the controller, using an on-board central processing unit, accesses a selected look-up table to determine the appropriate timing given the required speed, sensor inputs and load conditions of the engine.

The timing signal $S_T$ serves as a feedback signal to the controllers 62 and 64. The controllers 62 and 64 use the timing signal $S_T$ to determine the actual engine speed and compare the actual speed to a desired speed determined in part on the amount of fuel injected. In the event a controller determines that the actual speed cannot be maintained as compared to the desired speed (the speed demand signal), an overload demand level signal is output to the load controller. The overload demand level signal 80 serves to notify the load controller 66 that certain loads or some loads should be shed so that the desired speed can be maintained. The bank controller 62 and 64 are programmed to facilitate a variable acceleration/deceleration rate limiting function so that the controllers can limit the change of speed from any one of the selected digital speeds av, bv, cv, and dv (16 speed settings) to another of the selected speed settings.

The right bank controller 62 outputs a pulse width modulated fuel level signal 82 that represents a fuel delivery value that has been requested by the controller 62 and 64 equals a fueling value that is achieved. The right bank controller 62 computes the estimated value desired using the speed input and current fuel value demand to calculate the approximate amount of fuel that should be dispensed through the fuel delivery mechanism 30. As known in the art, each controller includes a central processing unit and associated memory for storing a program to facilitate control of the fuel timing and fuel duration requirements as well as monitoring other inputs.

The controllers 62 and 64 also facilitate engine protection for engine over speed and overload control. When the engine speed exceeds a predetermined RPM level for more than a predetermined period of time, the fuel demand is set to zero so that during an excessive engine speed condition, the engine is shut down to avoid a run away engine condition or other undesirable over speed condition.

As previously mentioned, the controllers 62 and 64 also provide an external indication whenever the demanded fuel exceeds the current maximum fuel limit. An overload event occurs when the demanded speed cannot be achieved or sustained. The pulse-width-modulated overload demand level signal has a duty cycle that is proportional to the overload demand on the engine. For example a 90 percent duty cycle represents a "no shed load" condition and a 10 percent duty cycle could represent a full "shed load" condition.

The load controller 66 requires fuel level to compute the air to fuel ratio to determine a suitable loading rate. The fuel level signal 82 is a pulse-width modulated output signal having a duty cycle proportional to the current dispensed fuel volume which is calculated by the controllers 62 and 64.

Figure 5:
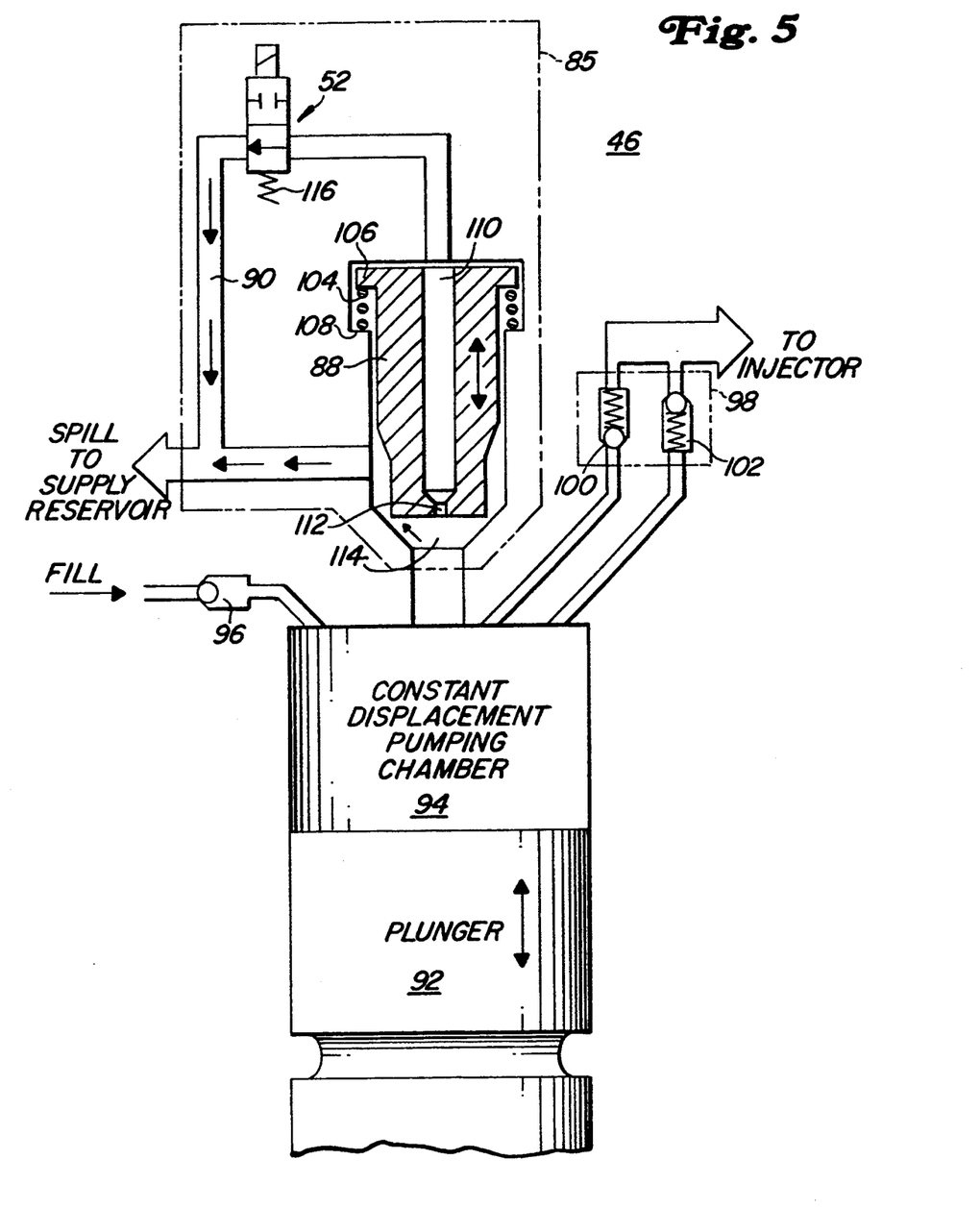
FIG. 5 is a schematic representation of a fuel delivery mechanism in accordance with the invention.

FIG. 5 schematically depicts the preferred fuel delivery mechanism 30 as incorporated into a fuel pump 84. The fuel pump 84 includes an electronically controlled spill system 46 which includes the electronically controlled solenoid valve 52 in fluid communication with a shuttle valve 88 or other suitable flow amplification device, and a spill path 90 which fluidly connects to a supply reservoir (not shown). The fuel pump 84 also includes a plunger 92 and constant displacement fuel pumping chamber 94. The constant displacement chamber 94 receives fuel through an inlet check valve 96. A pressure unloading delivery check valve 98, as known in the art, fluidly connects between the chamber 94 and the fuel injector (not shown). Such a delivery check valve typically includes a forward flow portion 100 and a reverse flow portion 102.

The shuttle valve 88 includes a biasing device 104, such as a spring, interposed between a top shoulder 106 and a housing lip 108 for resiliently biasing the shuttle valve 88. A central passage or drilling 110 extends the length of the valve to provide fluid communication between the solenoid valve 52 and the chamber 94. The central drilling includes a control orifice 112 at one end located proximate a base portion of the shuttle valve 88. A flow annulus 114 exists between the seating surfaces at the base portion of the shuttle valve. Fuel flows through the annulus when the shuttle valve is not seated, as will be described later.

The pumping chamber 94 may have a volume which exceeds the maximum volume of fuel required by the engine during an injection event. For example, the chamber may have volume displacement on the order of 8000 mm$^3$/stroke, whereas the engine may only require a delivery volume on the order of 1600 mm$^3$/stroke. Consequently, the spill volume may exceed 6000 mm$^3$/stroke. The larger chamber volume provides a timing range over which the full fuel amount may be delivered.

There are five primary roles and actuation principles of the electronic fuel injection pump 84. These five (5) modal Stages of fuel handling can be described as follows: fill, pump, spill, deliver, and retract. The spill and delivery stages are uniquely characterized by the electronically-controlled, variable initiation and duration of injection. These stages will be discussed in detail lastly.

The first two modes are consistent and occur repeatably as a function of engine rotation. Once per camshaft revolution each plunger 92 within the pump 84 is retracted (not related to above "retract" stage) downward via movement of the pushrod 48 (best seen in FIG. 2). This results in the suction of fuel (already pressurized in a supply reservoir) through the inlet check valve 96 effectuating complete fill of the pumping chamber 94 (bounded by plunger, barrel, and the top of the chamber). Further, and upon cam-lift actuation, the upward plunger motion serves to compress the now trapped volume of fuel.

The rapid pressure rise (often to levels of approx. 18 k.p.s.i.) of the fuel being pumped/compressed, in accordance with plunger area, lift rate, and bulk modulus of the fuel, can be relieved/dissipated in one of two ways. Either the fuel can be spilled/re-circulated back into the supply reservoir from the pumping chamber 94, or the fuel can be delivered, through the forward flow portion 100 of a pressure unloading delivery check valve 98 into the high pressure line 44 (best seen in FIG. 2) which leads to the injector, resulting in eventual fuel injection. Finally, and subsequent to each injection event, high pressure fuel is allowed to attenuate to a sufficiently lower level through the incorporation and actuation of the reverse flow portion 102 of the pressure unloading ("retracting") delivery check valve 98.

The fundamental concept, which enables both high pressure (up to 20 k.p.s.i.) and high flow (up to 1600 mm³/stroke) injection to be triggered over a range of timings (40 crank degree window of start variability), resides in the inherent functionality of the spill system 46. The shuttle valve 88 responds to the fluid control of the solenoid valve 52 which is actuated electrically through lines 50.

The spill system 46 operates basically as an "on/off" gate valve device. In general, actuation of the solenoid valve 52 relates to the spilling, or re-circulation of fuel from the pumping chamber 94 back to the supply reservoir. This results in the diversion of fuel from an otherwise deliberate path towards the injector.

Energization of the solenoid valve 52 leads to closing of the solenoid valve which results in a pressure rise above the shuttle valve 88 and overcoming the bias of the spring 104 thereby effectuating seating/closure of the valve 88 at its base proximate the pumping chamber 94. A seated/closed shuttle valve initiates and maintains injection while an open/lifted shuttle valve terminates injection by establishing a multi-branched fuel spill path through both the shuttle valve and the solenoid valve.

Conversely, de-energization of the solenoid valve 52 effectuates opening of the valve, via resilient bias device 116 (which acts as a fail-safe spill as opposed to an inject default), and attenuation of a hydraulic lock which, in turn, allows the shuttle valve 88, assisted also by injection pressure in the pumping chamber 94, to open. This opening of the shuttle valve 88, once again, establishes an unobstructed spill path, through the annulus 114, to the supply reservoir, which by nature of being the line of least resistance for fuel to flow effectuates termination of an injection event. Electronic and hydraulic delays (system lags) although, almost negligible, are mapped, throughout the operating range, and compensated for in the final determination of start and end points for the electronic command pulse to the solenoid.

The solenoid valve 52, unable to handle the higher spill rates required of an electronic fuel injection system having such a large range in fuel flow (i.e. 100–1600 mm³/stroke), relies upon the shuttle valve mechanism to effectively "amplify", or "boost", the solenoid valve's spill efforts. In essence, this two-stage valve arrangement is designed to act as a single, complimentary spill system comprised of a passive flow amplifier (shuttle valve) triggered by a smaller, than-as-would-be-required-for-a-stand-alone, solenoid valve.

Hydraulic functionality of the shuttle valve 88 is tailored for optimal response to the electronic actuation of the solenoid valve 52. To this end, the shuttle valve geometry is defined in conjunction with the solenoid valve spill rates and further tuned with respect to its hydraulic chamber and connecting passageways. Specific design features and/or considerations may include: the total lift, or travel of the shuttle valve as well as its mass/inertia; resilient bias forces of the spring 104; and characteristic pressure drops (i.e. deltas across both the lower outside shoulder-to-respective-"seating cone" annulus, and lower control orifice).

The advantage of this shuttle valve tuning yields a highly-responsive, two-state spill device. The shuttle valve is normally lifted (resilient bias, plus the periodic lift effect of pumped fuel pressure from the pumping chamber below). While lifted, the shuttle valve spills fuel through its center drilling 110, but primarily past its lower shoulder-to-seat annulus 114. Once the solenoid is energized/closed and fuel flow through the shuttle's center drilling 110 attenuates, the pressure drops across the control orifice 112 and shoulder-to-seat annulus 114 result in a hydraulic pressure imbalance, which seats the shuttle valve in its downward position at the base. This pressure imbalance is caused partially by high pressure zones created above the shuttle valve (due to no-flow) and a high pressure zone existing below the shuttle (due to pumping) against only the small lower face area between the lower shoulder and control orifice of the shuttle valve. This imbalance is further established by the fact that a pressure drop still exists as fuel flows past the shoulder annulus 114 resulting in only a fraction of the pumping pressure acting in an upwards manner against the midriff taper of the shuttle valve. Pressure drop across the control orifice 112 then effectuates shuttle re-lift after the commanded energization/injection period terminates. The lower/decreased pressure created just above the control orifice 112 in this case, due to resumed flow, promotes a hydraulic lift condition assisted, again, by the lift effect of pumped fuel pressure from the pumping chamber.

The unique fuel delivery mechanism 30 which includes the electronically-controlled solenoid valve 52 and the flow amplifier valve 88 allows higher fuel flow volumes than previously allowed by other designs. This unique feature facilitates electronic control of the fuel flow function to a designated cylinder on a variable timing basis.

Although the invention has been described with reference to a Vee-style diesel locomotive engine, it will be recognized that the inventive system may be suitable for any in-line engine or similarly sized compression ignition engine used for other purposes such as marine applications or stationary generator applications.

In an alternative embodiment, the functions of the right and left bank controllers 62 and 64 may be combined so that a single processing unit may be used. In addition, the interface signal conditioning module 68 may also be eliminated where the load controller 66 and the processing unit have a compatible signalling protocol. In yet another embodiment, the functions of the load controller 66, the signal conditioning module 68 and the left and right bank controllers 62 and 64 may be incorporated into a single control unit which may then communicate with a plurality of other control modules such as traction control modules, etc.

It will be recognized that although the fuel delivery mechanism for each cylinder has been described with reference to a pump-line-nozzle configuration, the inventive system may also be applied to a unit injection type configuration where the fuel injector is in line with the fuel pump and positioned above the cylinder. It will also be recognized that a larger electronically controlled solenoid which provides a suitable fuel flow rate of at least 100–1600 mm$^3$/stroke may be used in place of the combined electronic solenoid and shuttle valve combination. It will be recognized that the system can be modified to develop higher injection pressures.

Specific embodiments of novel apparatus for an electronic fuel injection system for large compression ignition engines has been described for the purposes of illustrating the manner in which the invention may be used and made. It should be understood that the implementation of other variations and modifications of the invention in its various aspects will be apparent to those skilled in the art, and that the invention is not limited by the specific embodiments described. It is therefore contemplated to cover by the present invention any and all modifications, variations, or equivalents that fall within the true spirit and scope of the basic underlying principles disclosed and claimed herein.

What is claimed is:

1. An electronic fuel injection system for a compression ignition engine having a per cylinder displacement volume of at least 5.5 liters, the system comprising:

individual fuel delivery means for each corresponding cylinder, said fuel delivery means having a constant displacement fuel chamber;

multi-track optical encoding means, operatively coupled to a cam shaft, for generating a timing signal and a cylinder index signal;

means, responsive to said timing signal and said cylinder index signal, for electronically controlling said individual fuel delivery means;

said fuel delivery means having means, responsive to an output signal from said electronic control means, for providing a fuel flow volume range of between approximately 100–1600 mm$^3$/stroke over a fuel injection pressure range of between approximately 10–20 k.p.s.i. to a corresponding fuel injecting means wherein said means for providing a fuel flow volume further includes electronically controlled valve means responsive to said output signal, and shuttle valve means, in fluid communication with said electronically controlled valve means, for providing fuel flow spill from said constant displacement fuel chamber; and wherein said electronic control means is adapted to sequentially actuate each corresponding fuel injecting means.

2. An electronic fuel injection system for a compression ignition engine having a per cylinder displacement volume of at least 5.5 liters, the system comprising:

individual fuel delivery means for each corresponding cylinder, said fuel delivery means having a constant displacement fuel chamber;

means for generating a timing signal and a cylinder index signal;

means, responsive to said timing signal and said cylinder index signal, for electronically controlling said individual fuel delivery means and for generating an overload indication signal;

load control means for outputting a signal corresponding to one of a plurality of selected engine speed levels and responsive to activate and/or deactivate a controllable load in response to said overload indication signal;

said individual fuel delivery means further having electronically actuated valve means, responsive to a fuel control output signal, for providing fuel to a corresponding fuel injecting means;

such that said electronic fuel control means generates said overload indication signal by comparing an actual speed determined from said timing signal to a desired speed determined by said electronic fuel control means.

3. A unitized power assembly, for a compression ignition engine having a per cylinder displacement volume of at least 5.5 liters, comprising:

a cylinder and corresponding fuel delivery means wherein said fuel delivery means includes a constant displacement fuel chamber, electronically controlled valve means for accommodating a portion of fluid flow spill from said constant displacement chamber and responsive to a control signal, and shuttle valve means, in fluid communication with said electronically controlled valve means, for providing additional fuel flow spill from said constant displacement fuel chamber.

4. The unitized power assembly of claim 3 wherein said fuel delivery means provides a fuel injection pressure range of between approximately 10–20 k.p.s.i. and said electronically controlled valve means in combination with said shuttle valve means provide a fuel flow volume range between approximately 100–1600 mm$^3$/stroke to corresponding fuel injection means.

5. The unitized power assembly of claim 3 wherein said fuel delivery means is a pump-line-nozzle fuel injection configuration.

6. An electronic fuel injection system for a compression ignition engine having a per cylinder displacement volume of at least 5.5 liters, the system comprising:

individual fuel delivery means for each corresponding cylinder, said fuel delivery means having a constant displacement fuel chamber;

multitrack optical shaft encoding means, operatively coupled to a rotating cam shaft, for generating a timing signal and a cylinder index signal;

means, responsive to said timing signal and said cylinder index signal, for electronically controlling said individual constant displacement fuel delivery means; and said constant displacement fuel delivery means having means, responsive to an output signal from said electronic control means, for providing a fuel delivery volume range of between approximately 100–1600 mm$^3$/stroke over a fuel injection pressure range of at least between 10–20 k.p.s.i. to a corresponding fuel injecting means;

said delivery means for providing a fuel delivery volume over said injection pressure range comprising electronically controlled valve means responsive to said output signal for providing a portion of fuel flow spill from said constant displacement fuel pumping chamber, and further comprising valve means, in fluid communication with said electronically controlled valve means, for providing additional fuel flow spill from said constant displacement fuel chamber.

7. The system of claim 6 wherein said electronic control means is adapted to sequentially actuate each corresponding fuel injecting means.

8. The system of claim 6 wherein the system is adapted to control fuel injection for a Vee-style locomotive engine.

9. The system of claim 6 wherein said means for providing fuel flow is comprised of a unitized power assembly having a cylinder and corresponding fuel pump-line-nozzle fuel injection configuration wherein said fuel pump includes electronically controlled valve means responsive to said output signal, and valve means, in fluid communication with said electronically controlled valve means, for providing said fuel flow volume ranges.

10. The system of claim 6 wherein said electronic control means includes a first bank controller for controlling the injection timing for a first bank of cylinders, a second bank controller for controlling the injection timing for a second bank of cylinders, and load control means coupled to said first and second bank controllers.

11. The system of claim 10 wherein said electronic control means is adapted to sequentially actuate each corresponding fuel injecting means.

12. The system of claim 10 wherein the system is adapted to control fuel injection for a Vee-style locomotive engine.

* * * * *

UNITED STATES PATENT AND TRADEMARK OFFICE
CERTIFICATE OF CORRECTION

PATENT NO. : 5,394,851
DATED : March 7, 1995
INVENTOR(S) : Robert D. Cryer, et. al.

It is certified that error appears in the above-indentified patent and that said Letters Patent is hereby corrected as shown below:

Title page, item [73], Assignee: add as assignee after "General Electric Company, Erie, Pa." -- and Lucas Industries Public Limited Company--.

Signed and Sealed this

Twenty-fourth Day of October, 1995

*Attest:*

BRUCE LEHMAN

*Attesting Officer*  *Commissioner of Patents and Trademarks*